United States Patent [19]

Knapp et al.

[11] Patent Number: 4,660,076

[45] Date of Patent: Apr. 21, 1987

[54] COLOR DISPLAY APPARATUS INCLUDING A CRT WITH INTERNAL SWITCHING VALVE

[75] Inventors: Alan G. Knapp, Crawley; Harold W. Ellis, Guildford, both of England

[73] Assignee: U.S. Philips Corporation, New York, N.Y.

[21] Appl. No.: 598,958

[22] Filed: Apr. 11, 1984

[30] Foreign Application Priority Data

Apr. 20, 1983 [GB] United Kingdom ................. 8310707

[51] Int. Cl.[4] ......................... H04N 9/27; H01J 29/10; H01J 29/80; H01J 43/00

[52] U.S. Cl. .............................. 358/73; 313/103 CM; 313/473; 315/375

[58] Field of Search ............ 358/72, 73; 313/103 CM, 313/105 CM, 400, 408, 463, 473; 315/375

[56] References Cited

U.S. PATENT DOCUMENTS 3,860,849 1/1975 Schagen et al. ...................... 313/400
4,281,272 7/1981 Spilsbury .............................. 358/72
4,450,387 5/1984 Reed et al. ........................... 358/73

FOREIGN PATENT DOCUMENTS 1402547 8/1975 United Kingdom .
1434053 4/1976 United Kingdom .
2023332 12/1979 United Kingdom .
2101396 1/1983 United Kingdom .

OTHER PUBLICATIONS

Washington, D., et al., "Technology of Channel Plate Manufacture", *Acta Electronica*, vol. 14, No. 2, Apr. 1971, pp. 201-224.
Spencer, G. R., "Performance of Penetration Color CRTs in Single-Anode and Dual-Anode Configurations", Proceedings of the SID vol. 22/1, 1981, pp. 15-17.

*Primary Examiner*—James J. Groody
*Assistant Examiner*—Randall S. Svihla
*Attorney, Agent, or Firm*—Robert J. Kraus

[57] ABSTRACT

A display apparatus which comprises a display tube having a channel plate electron multiplier and a penetron screen having an electrode (hereinafter termed the screen electrode) thereon by which an accelerating field is provided between the electron multiplier and the screen. In order to obtain rapid switching of the voltage applied to the screen electrode, a high voltage power supply has a thermionic valve included within the display tube envelope to shunt current to ground when switching from a high voltage to a low voltage. The anode and cathode of the valve are connected respectively to the screen electrode and the electron gun cathode. The valve may be a triode or tetrode. A feedback arrangement is provided which causes the voltage on the screen electrode to remain substantially constant in spite of variations in screen current.

7 Claims, 3 Drawing Figures

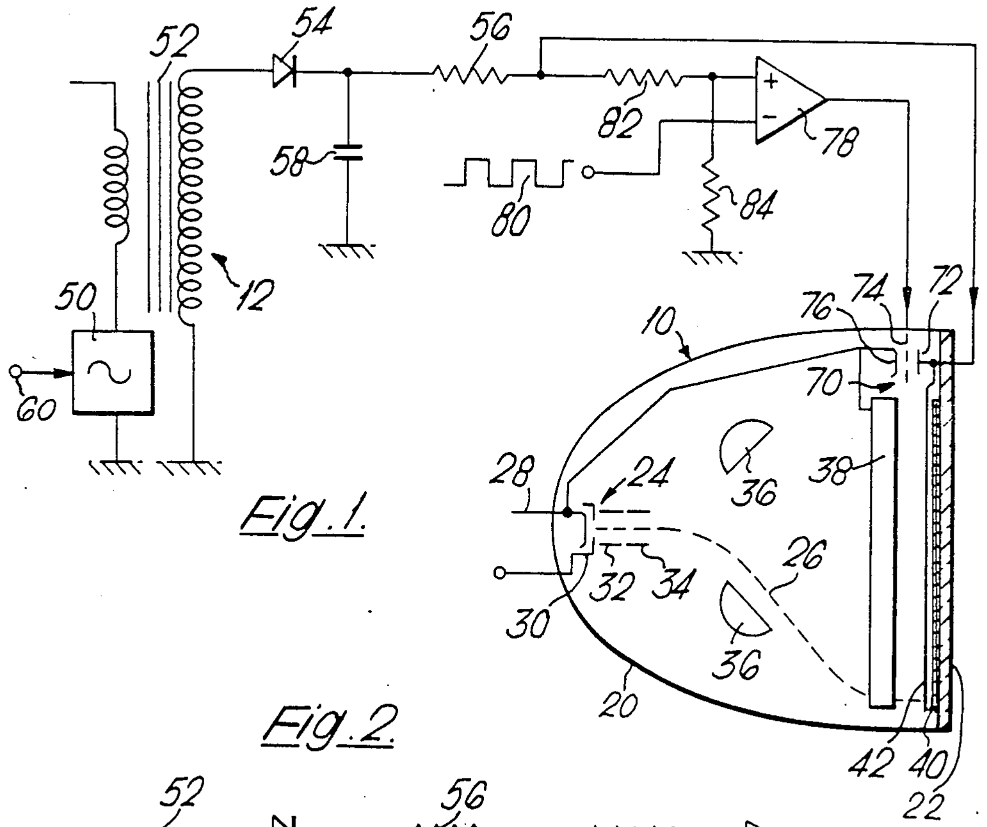
Fig. 1.
Fig. 2.
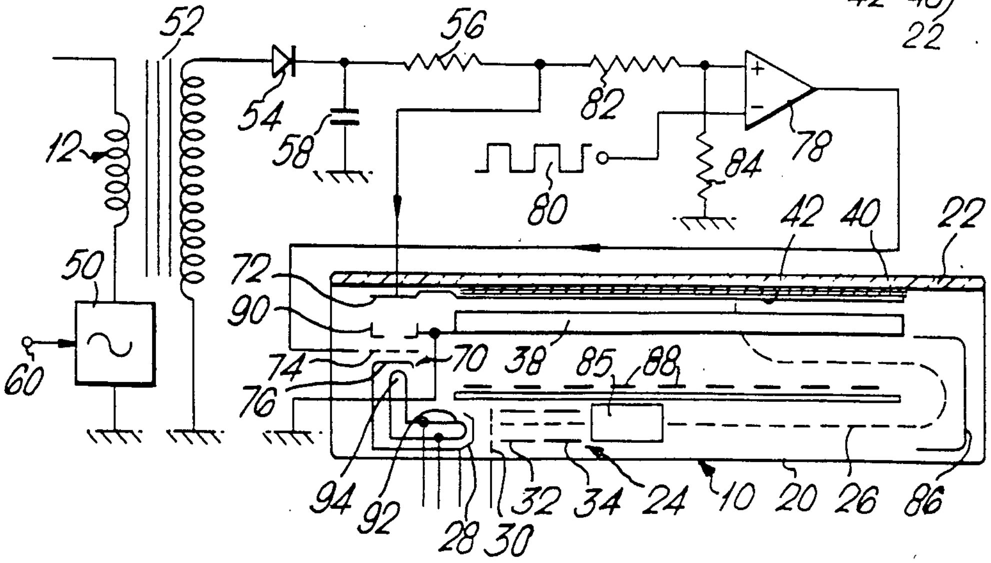

COLOR DISPLAY APPARATUS INCLUDING A CRT WITH INTERNAL SWITCHING VALVE

BACKGROUND OF THE INVENTION

The present invention relates to a display apparatus comprising a colour display tube including a penetron cathodoluminescent screen and a power supply for switching the post deflection acceleration (PDA) voltage between different values in order to produce the desired colour.

Penetron screens are known and are discussed in an article "Performance of Penetration Colour CRTs in Single-Anode and Dual-Anode Configurations" by G. R. Spencer in Proceedings of the SID Vol. 22/1, 1981, pages 15 to 17. G. R. Spencer highlights some problems in using penetron screens in single anode cathode ray tubes. As is known, different colours are produced using a dual primary-colour penetron phosphor by varying the anode to screen voltages of the tube. One effect illustrated in broken lines in FIG. 3 of the Spencer article is that the spot size and thus the line width changes over the range of voltages that can be used. Accordingly the electron beam has to be refocused if the spot size is to be maintained constant. Another problem with varying the anode to screen voltages is that in order to maintain a substantially constant picture size then the deflection current has to be varied with screen voltage. G. R. Spencer proposes reducing the effects of these problems by separating the anode of the electron gun and the transparent electrode on the phosphor screen into two independent electrodes. However this dual electrode arrangement produces an increase in line width with increasing beam current and requires an increase in deflection current for increases in screen voltage.

One proposal for separating the addressing of an electron beam from the light and colour generation in a display tube employing a penetron screen is disclosed in British Patent Application No. 8230244. This patent specification discloses a single beam display tube comprising a channel plate electron multiplier which comprises a stack of apertured dynodes the holes in which are aligned to form channels. A low energy electron beam is scanned across the input face of the electron multiplier. The electron multiplier produces a current multiplied electron beam which is used for light and colour generation. The cathodoluminescent screen comprises groups of phosphor elements, at least one phosphor element of each group comprising a penetron component with two colour phosphors such as red and green, and another phosphor element having a different phosphor such as blue.

Another approach to producing coloured images from a display tube including a channel plate electron multiplier and a penetron cathodoluminescent screen is disclosed in British Patent Specification No. 1402547. In Specification No. 1402547 a continuous two-layer red-green penetron phosphor layer is provided on the faceplate or other optically transparent carrier substrate disposed between the output surface of the electron multiplier and the faceplate. Additionally a blue light emitting phosphor is provided on a first colour selection electrode carried by the output surface of the electron multiplier and a second colour selection electrode is provided between the green penetron phosphor and the faceplate or its supporting substrate, the red penetron phosphor being closer to the electron multiplier than the green one. In operation, by varying the field set up between the first and second colour selection electrodes one of the different phosphors can be activated by the electron beam emerging from the channel plate electron multiplier.

When scanning such screens it is necessary to switch rapidly the PDA voltage applied to the screen electrode, which is coextensive with the cathodoluminescent screen, between a low voltage of, for example +7 kV relative to the output of the channel plate electron multiplier and a high voltage of, for example +14 kV; otherwise the colour purity of the image will be adversely affected.

Known hig voltage circuits frequently comprise a low voltage source which is stepped-up to a high voltage by a transformer and rectifier arrangement, or a voltage multiplier of, for example, Cockroft-Walton type. Generally a capacitor is connected between the output terminal of the high voltage circuit and a reference voltage point, for example ground. In operation the voltage at the output terminal can be increased rapidly, but the reverse is not always the case because of the time taken for the charge on the capacitor to decrease to its desired level. This problem is generally overcome by discharging the capacitor by suitable switching means such as a thermionic valve or a series combination of high voltage transistors. In both cases the additional circuitry is bulky and/or expensive, especially if used with a flat display tube of the type disclosed in British Patent Specification 2101396 having a screen size of the order of 100 mm diagonal and using a high resolution glass matrix electron multiplier.

SUMMARY OF THE INVENTION

An object of the present invention is to reduce the size and cost of the power supply to be used with a display tube having a channel plate electron multiplier and a penetron screen.

According to the present invention there is provided a display apparatus comprising in combination a colour display tube and power supply means. The tube has an envelope in which are provided an electron gun for producing an electron beam, a channel plate electron multiplier having input and output surfaces, means for scanning the electron beam across the input surface, and a cathodoluminescent screen arranged parallel to, but spaced from the output surface of the electron multiplier. The cathodoluminescent screen comprises at least a two colour penetron phosphor and an overlapping electrode (hereinafter termed screen electrode) The power supply means, which provides predetermined potential differences between the output surface of the electron multiplier and the screen electrode, includes a thermionic valve disposed within the envelope for facilitating rapid switching of the potential difference between at least two voltages.

In one embodiment of the display apparatus, the thermionic valve has an external anode resistor coupled in series with the power supply which, in use, produces a substantially constant voltage and wherein the thermionic valve is actuated to switch said potential difference between at least two voltages.

In another embodiment the power supply is controlled to produce at least two predetermined voltages and the thermionic valve is actuated to ensure a substantially instantaneous change between a higher voltage and a lower voltage.

The apparatus in accordance with the present invention enables the penetration principle of colour selection to be implemented by simply switching the screen voltage without the need for corrections to the scan amplitude or gun focus needed in conventional penetron display tubes not having a channel plate electron multiplier. Additionally by being able to switch the screen voltage rapidly the colour purity of the image is ensured. By arranging the thermionic valve within the tube envelope its additional volume is insignificant relative to the volume of the display tube and its cost is low. The thermionic valve may comprise a triode or tetrode whose anode is coupled by a low impedance path to the screen electrode of the display tube.

Additional external connections can be avoided by the valve cathode being coupled by a low impedance path to the cathode of the electron gun of the display and in the case of indirectly heated cathodes then the heaters can be connected in parallel.

There is only one additional external connection which is to the grid of the triode or to the first (or the control grid) of the tetrode. As the signal applied to the grid or first grid is a switching drive voltage of the order of 10 V, this extra external connection can comprise an additional pin in the customary connector provided in display tubes.

The video drive for the display tube may be applied to the grid of the electron gun rather than to the cathode as is customary with a conventional colour display tube used for television and datagraphic display. In the case of a flat display tube of the type disclosed in British Patent Specification No. 2101396 which has folded electron optics and electrostatic frame deflection it is important to keep the beam energy constant otherwise the electron beam path would be altered leading to distortion of the reproduced image. This problem is avoided by the video drive being to the grid of the electron gun.

Conveniently the anode of the thermionic valve may comprise an extension of the screen electrode thereby reducing the volume of the valve further.

A feedback connection may be provided between the screen electrode and the power supply whereby the screen voltage is held substantially constant in spite of variations in screen current. This will avoid undesired changes in colour particularly in the case of a bright image.

The channel plate electron multiplier may be of a glass matrix type which is particularly suitable for small high resolution datagraphic display tubes or comprise a stack of separate metal dynodes which is more suitable for bigger display tubes.

BRIEF DESCRIPTION OF THE DRAWING

The present invention will now be described, by way of example, with reference to the accompanying drawings, wherein:

FIG. 1 is a schematic illustration of a first embodiment of the present invention which includes a magnetically deflected display tube and a triode valve, FIG. 2 is a schematic illustration of a second embodiment of the present invention which includes a flat, electrostatically deflected display tube and a tetrode valve.

In the drawings the same reference numerals have been used to indicate the same features.

DESCRIPTION OF THE PREFERRED EMBODIMENTS

Figure 3:
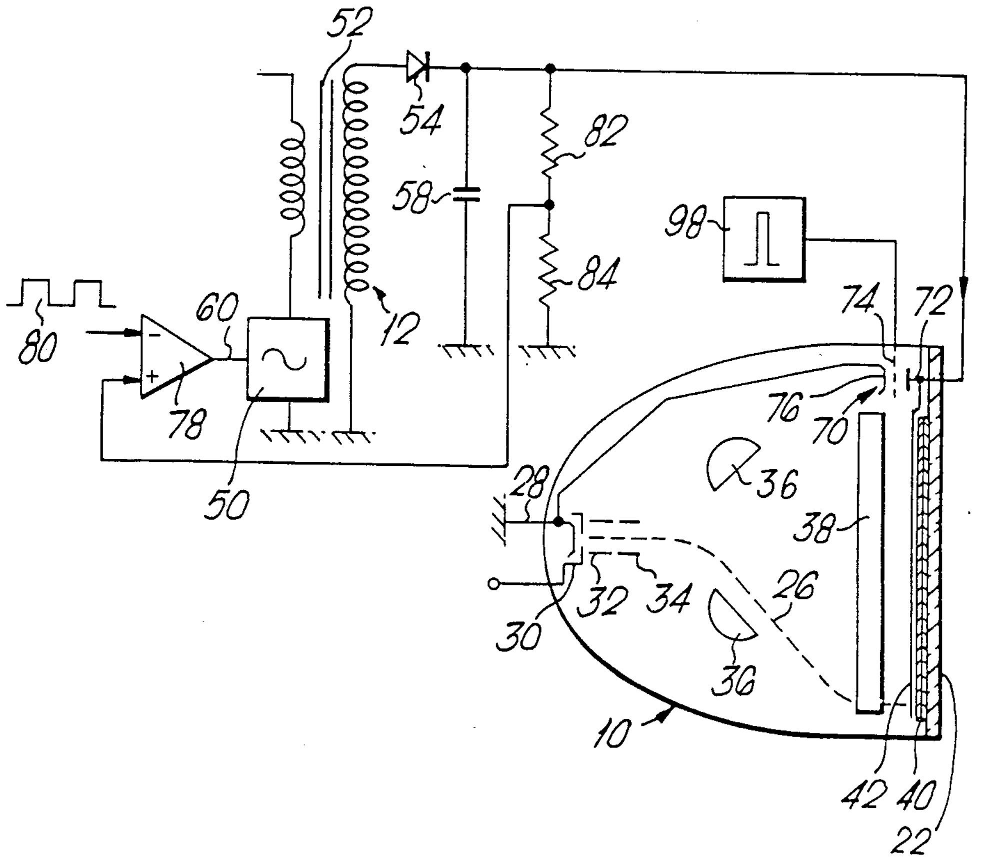
FIG. 3 is a schematic illustration of a third embodiment of the present invention in which the display tube is similar to that shown in FIG. 1.

Referring to FIG. 1, the display apparatus comprises a display tube 10 and a high voltage power supply 12.

The display tube 10 comprises a metal or glass envelope 20 having an optically transparent faceplate 22. The faceplate 22 may be curved or flat. Within the envelope 20 is provided an electron gun 24 for generating a low voltage, low current electron beam 26. The electron gun 24 comprises a cathode 28, a control grid 30 to which a video drive signal is applied and two anodes 32, 34 for focusing the electron beam 26. An electromagnetic beam deflector 36 is provided in the envelope 20 and serves to scan the electron beam 26 across the input face of a channel plate electron multiplier 38. The output from the electron multiplier 38 is directed onto a cathodoluminescent screen 40 mounted parallel to the electron multiplier 38. If the faceplate 22 is flat and parallel to the output face of the electron multiplier 38 the screen 40 can be provided on the faceplate 22 as shown; otherwise the screen can be provided on an optically transparent, flat support which is mounted parallel to the output face of the electron multiplier 38. The screen 40 comprises a penetron phosphor layer. The penetron layer may comprise a layer of green phosphor on an optically transparent support, for example the faceplate 22, a barrier layer of a non-luminescent material, a thin layer of a red phosphor on the barrier layer and a film of aluminium covering the red phosphor. An electrical connection is made to the aluminium layer by which a beam accelerating voltage is applied. For convenience of description the aluminium layer will be referred to as the screen electrode 42. Another known way of making the penetron layer is termed the onion skin phosphor technique in which green phosphor grains covered by a barrier layer which in turn is covered by red phosphor grains, are deposited on a transparent support. In operation the red phosphor is excited in response to a low excitation voltage and the green phosphor is excited in response to a high excitation voltage.

The electron multiplier 38 may comprise a stack of a metal dynodes or a glass matrix. In the former case the electron multiplier 38 other. Apart from the input dynode, which has convergent apertures, the remainder of the dynodes have barrel-shaped apertures therein. If the dynodes are made of a material which is not highly secondary emissive the apertures may have a layer of secondary emissive material provided in them. In use each dynode is maintained at a voltage which is typically in the range of 200 to 500 V higher than the preceding dynode in the stack. The details of the design, construction and detailed operation of the current multiplier 38 are not essential to the understanding of the invention, but if more information is necessary refer to British Patent specifications Nos. 1434053 and 2023332A, details of which are hereby incorporated by reference.

In the case of a glass matrix channel plate electron multiplier 38 this comprises thousands of channels of, for example, 12 μm diameter and 15 μm pitch. The fabrication of glass matrix electron multipliers is generally known and accordingly it will not be described in detail. However reference can be made to Acta Electronica Volume 14, No. 2, Apr. 1971 for additional information.

The high voltage power supply 12 comprises an oscillator 50 whose output is connected to the primary winding of a high voltage transformer 52. The output voltage of the oscillator 50 is substantially constant; if it is desired to vary the output voltage a control means such as that described in connection with FIG. 3 can be connected to a control input 60. The secondary winding of the transformer 52 is connected via a rectifier 54 and a series resistor 56 to the screen electrode 42. A smoothing capacitor 58 is connected between the output of the rectifier 54 and a voltage reference point, for example ground. The resistor 56 also serves as the anode resistor for a thermionic valve 70 which is used for switching the screen voltage between a high and low value and vice versa.

In FIG. 1 the thermionic valve 70 comprises a triode having an anode 72, a grid 74 and a cathode 76. The valve 70 is provided within the envelope 20. Because the anode 72 and the electrode 42 are at the same potential, the anode 72 can comprise an extension of the screen electrode 42, thus avoiding having to provide a separate connection to the anode 72 through the wall of the envelope 20. The cathode 76 is at the same voltage as the electron gun cathode 28 and the input side of the channel plate electron multiplier 38, and consequently these three elements are together by low impedance paths. A separate connection has to be provided to the grid 74. By applying an appropriate switching voltage to the grid 74 the valve 70 is switched, typically every 10 mS, between two states of conduction such that the screen voltage is held at the required levels.

As it is desirable to maintain the screen voltage constant in spite of changes in screen current due to changes in brightness and picture content, feedback is provided from the anode 72 to the grid 74. This is done by connecting the output of an operational amplifier (op-amp) 78 to the grid 74. The switching signal 80 is applied to an inverting input of the op-amp 78 and a divided down portion of the screen/ anode voltage is applied to the non-inverting input of the op-amp 78. The divided down portion is derived by a resistive potential divider comprising a feedback resistor 82 and another resistor 84.

FIG. 2 illustrates an embodiment of a flat display tube 10 having folded electron optics. An embodiment of such a flat display tube 10 is described in detail in British Patent Specification 2101396A, which is hereby incorporated by reference. A low current, low voltage electron beam 26 is produced by the electron gun 24. It undergoes line scanning using a pair of diviergent plates 85 before being turned through 180° by a reversing lens 86. By means of a series of substantially parallel electrodes 88 the electric field between the electrodes 88 and the input to the channel multiplier 38 is varied to accomplish frame scanning over the input of the channel multiplier 38. The current multiplied beam from the channel multiplier 38 is accelerated to the screen 40 by the field established between the output of the channel plate electron multiplier 38 and the screen electrode 42. The channel plate electron multiplier 38 can be of a glass matrix type or separate metal dynode type.

The high voltage power supply 12 is as described with reference to FIG. 1. However the thermionic valve 70 included in the tube envelope comprises a tetrode whose second grid 90 is connected to the input of the channel plate multiplier 38 which in turn in connected to a reference potential source, namely ground. The provision of the second grid 90 reduces the grid drive voltage of the valve 70. The cathodes 28 and 76 are connected together and in turn are connected to a source of −400 V. As the cathodes 28 and 76 are indirectly heated, then as shown their heaters 92, 94 are connected in parallel. The video drive for the display tube 10 is applied to the grid 30 of the electron gun. It is particularly important in this embodiment which has electrostatic beam deflection to keep the beam energy constant which would not be possible if the video drive is applied to the cathode 28. If the beam current is varied then the reflection of the beam at the reversing lens 86 would vary and also at the frame deflection stage, instead of tracing out a straight line, the line would be deformed as the beam energy varied. Conveniently the cathode 76 and the first and second grids 74, 90 may comprise a cathode, grid and first anode of a conventional cathode ray tube electron gun.

Referring now to the embodiment shown in FIG. 3, the power supply arrangement for this embodiment is different from the embodiments of FIGS. 1 and 2 in which the output of the oscillator 50 is constant and the switching of the screen voltage is done by the thermionic valve 70. However in FIG. 3, the oscillator output voltage is varied in accordance with the switching waveform 80 applied to the control input 60 of the oscillator 50 by way of the op-amp 78. The junction of the rectifier 54 and the capacitor 58 is connected directly to the screen electrode 42 and the anode 72 of the valve 70. A pulse source 98 is connected to the grid 74 of the valve 70. The cathode 28 and 76 of the electron gun 24 and the valve 70, respectively, are connected to ground. Feedback to the oscillator 50 from the output of the high voltage power supply 12 is provided by the op-amp 78.

In operation the charge on the capacitor 58 varies in accordance with the switching waveform 80. The change from a low to a high voltage is substantially instantaneous thereby ensuring colour purity over the entire area of the screen 40. However the change from a high to a low voltage is, unless the charge on the capacitor 58 is reduced substantially instantaneously, a slower one due to the exponential decay of the charge on a capacitor 58. The visible effect of such a decay is that the colour purity of the image would change over the frame, for example it will begin predominantly green and change progressively to red. In FIG. 3 the rapid reduction of the charge on the capacitor 58 is done by the switching-on of the valve 70 by means of the pulse source 98. Depending on the type of scanning being done, the pulse source 98 produces a pulse at the point where the power supply 12 switches from the high to the low voltage state and in the case of raster scanning this could occur during either a line flyback period or a frame flyback period.

In these embodiments a display apparatus is provided which is able to produce a colour image whose resolution is dependent on both the pitch of the channels in the electron multiplier and the size of the spot from the electron gun. In the case of the glass matrix electron multiplier which has a typical channel pitch of 15 μm, the resolution will in most cases be determined by the size of the spot from the electron beam.

It is to be understood that the illustrated embodiments are not mutually exclusive in that a triode valve can be used in FIG. 2 and a tetrode in FIGS. 1 and 3. Furthermore for convenience of description the screen has been assumed to be entirely a penetron one but it may comprise groups of elements of the type disclosed in British Patent Application No. 8230244, wherein in each group one type of element is a two colour penetron phosphor and a second type of element is a phosphor element of a third colour. However it should be borne in mind that the electron multiplier disclosed in Application No. 8230244 is a metal dynode one.

We claim:

1. A color display apparatus comprising:

(a) a color display tube comprising an envelope containing:

(1) a screen having first and second luminescent layers and a screen electrode parallel thereto, said layers luminescing in respective colors when excited by electrons accelerated through respective higher and lower accelerating potential differences;

(2) a channel plate electron multiplier having an input and an output side, said output side being parallel to and spaced apart from the screen;

(3) an electron gun for producing an electron beam; and (4) means for scanning the electron beam across the input side of the channel plate electron multiplier; and (b) means for controllably producing said higher and lower accelerating potential differences between the screen electrode and the output side of the channel plate electron multiplier, said means including:

(1) a thermionic valve contained within the color display tube envelope and comprising an anode electrically connected to the screen electrode, a cathode adapted for electrical connection to a reference voltage, and a grid; and (2) high voltage power supply means for selectively applying higher and lower voltages to the screen electrode in response to an applied switching signal, said power supply means including a variable voltage power supply having an output electrically connected to said screen electrode, feedback circuitry electrically connected to said screen electrode for sensing the voltage at the screen electrode, screen voltage control circuitry having an input for receiving said switching signal, having an input electrically connected to said feedback circuitry, and having an output electrically connected to said variable voltage power supply for applying a control voltage to the power supply to maintain the screen electrode voltage constant at the selected voltage despite fluctuations of electric current in the screen electrode; and (3) a pulse source electrically connected to the grid for applying a pulse thereto for momentarily increasing the valve's anode current whenever the voltage applied to the screen electrode by the high voltage power supply means changes from the higher voltage to the lower voltage.

2. A color display apparatus as in claim 1 where the thermionic valve is a triode.

3. A color display apparatus as in claim 1 where the anode of the thermionic valve is formed by a portion of said screen electrode.

4. A color display apparatus as in claim 1 where the cathode of the thermionic valve is electrically connected to a cathode of the electron gun, and where said electron gun includes a grid adapted for electrical connection to a video drive signal.

5. A color display apparatus as in claim 1 where the channel plate electron multiplier comprises a stack of metal dynodes.

6. A color display apparatus as in claim 1 where the multiplier comprises a glass matrix channel plate electron multiplier.

7. A color display apparatus as in claim 1 where said color display tube comprises a flat color display tube.

* * * * *